United States Patent
McLeod et al.

(10) Patent No.: US 6,682,806 B1
(45) Date of Patent: Jan. 27, 2004

(54) METHOD OF APPLYING A PROTECTIVE FILM, OPTIONALLY INCLUDING ADVERTISING OR OTHER VISIBLE MATERIAL, TO THE SURFACE OF A HANDRAIL FOR AN ESCALATOR OR MOVING WALKWAY

(75) Inventors: John McLeod, Scarborough (CA); Ronald L. Bugg, Castleton (CA)

(73) Assignee: Ronald H. Ball, Ontario (CA)

( * ) Notice: Subject to any disclaimer, the term of this patent is extended or adjusted under 35 U.S.C. 154(b) by 0 days.

(21) Appl. No.: 09/252,784

(22) Filed: Feb. 19, 1999

(51) Int. Cl.⁷ ............... B32B 3/00; B32B 7/14
(52) U.S. Cl. ............ 428/203; 428/195; 428/913; 428/336
(58) Field of Search ............... 428/201, 195, 428/203, 206, 207, 913; 198/336, 335, 321

(56) References Cited

U.S. PATENT DOCUMENTS

| | | | |
|---|---|---|---|
| 5,020,256 A | | 6/1991 | French ............... 40/661 |
| 5,048,823 A | * | 9/1991 | Bean ............... 272/111 |
| 5,160,009 A | * | 11/1992 | Iyoda et al. ............ 198/337 |
| 5,354,397 A | * | 10/1994 | Miyake et al. ............ 156/77 |
| 5,587,218 A | * | 12/1996 | Betz ............... 428/67 |
| 5,743,064 A | * | 4/1998 | Bennett ............... 52/718.04 |
| 6,047,809 A | | 4/2000 | Idetsuki ............... 198/337 |
| 6,450,228 B1 | * | 9/2002 | McLeod et al. ............ 156/356 |

FOREIGN PATENT DOCUMENTS

| | | | | |
|---|---|---|---|---|
| CA | 1304035 | | 5/1988 | ............ G09F/19/00 |
| DE | 29811446 U1 | | 5/1997 | ............ G09F/7/16 |
| EP | 0 316 384 B1 | | 5/1988 | ............ G09F/19/00 |
| FR | 2610751 | | 8/1988 | |
| FR | 2728377 | | 6/1996 | |
| GB | 2 293 478 | * | 3/1996 | |
| GB | 2293478 | | 3/1996 | |
| IT | 660506 | | 12/1961 | |
| JP | 48-25687 | | 3/1973 | |
| JP | 55-131076 | | 10/1980 | |
| JP | 57-112369 | | 12/1980 | |
| JP | 57-130883 | | 2/1981 | |
| JP | 57-130883 | * | 8/1982 | |
| JP | 60-178882 | | 11/1985 | |
| JP | 61-59274 | | 4/1986 | |
| JP | 62-183344 | | 8/1987 | |
| JP | 62-189147 | | 8/1987 | |
| JP | 62-157876 | | 10/1987 | |
| JP | 2-500137 | | 1/1990 | |
| JP | 2-41932 | | 3/1990 | |
| JP | 03-066887 | | 3/1991 | |
| JP | 3-86383 | | 8/1991 | |
| JP | 03-272994 | * | 12/1991 | |
| JP | 05-306087 | | 11/1993 | |
| JP | 6-166154 | | 6/1994 | |
| JP | 06-206684 | | 7/1994 | |
| JP | 6-206684 | | 7/1994 | |
| JP | 7-101659 | | 4/1995 | |
| JP | 125961 | | 5/1995 | |
| JP | 7-125961 | | 5/1995 | |
| JP | 206352 | | 8/1995 | |
| JP | 07-206352 | | 8/1995 | |
| JP | 7-330271 | | 12/1995 | |
| JP | 8-248883 | | 9/1996 | |
| JP | 8-286614 | | 11/1996 | |
| JP | 10-59672 | | 3/1998 | |
| JP | 10-059672 | | 3/1998 | |
| JP | 10-081478 | * | 3/1998 | |
| JP | 147489 | | 6/1998 | |
| JP | 10-147489 | | 6/1998 | |
| JP | 10-305487 | * | 11/1998 | |
| JP | 2000-103585 | | 4/2000 | |

* cited by examiner

Primary Examiner—B. Hamilton Hess
Assistant Examiner—B. Shewareged
(74) Attorney, Agent, or Firm—McDermott, Will & Emery; Paul Devinsky

(57) ABSTRACT

A film and a method of applying the film to a handrail of an escalator or moving walkway are provided. The film can be a single or double layered film. Printed matter, e.g. advertising, can be applied to or between the films. An apparatus and related method for applying the film are also included and rely on the motion of the handrail to unroll a supply of the film, with one or more rollers pressing the film onto the handrail.

11 Claims, 13 Drawing Sheets

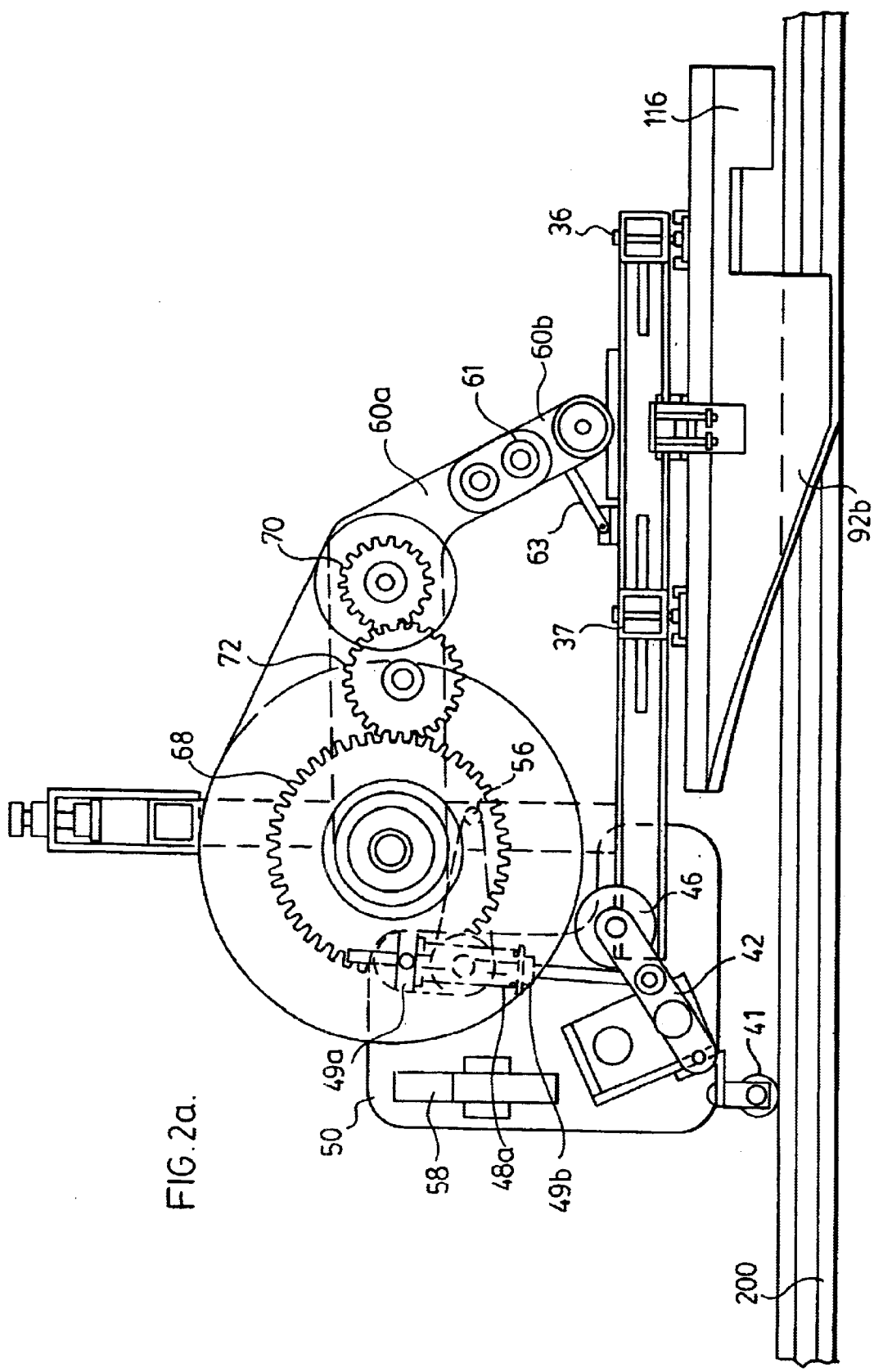

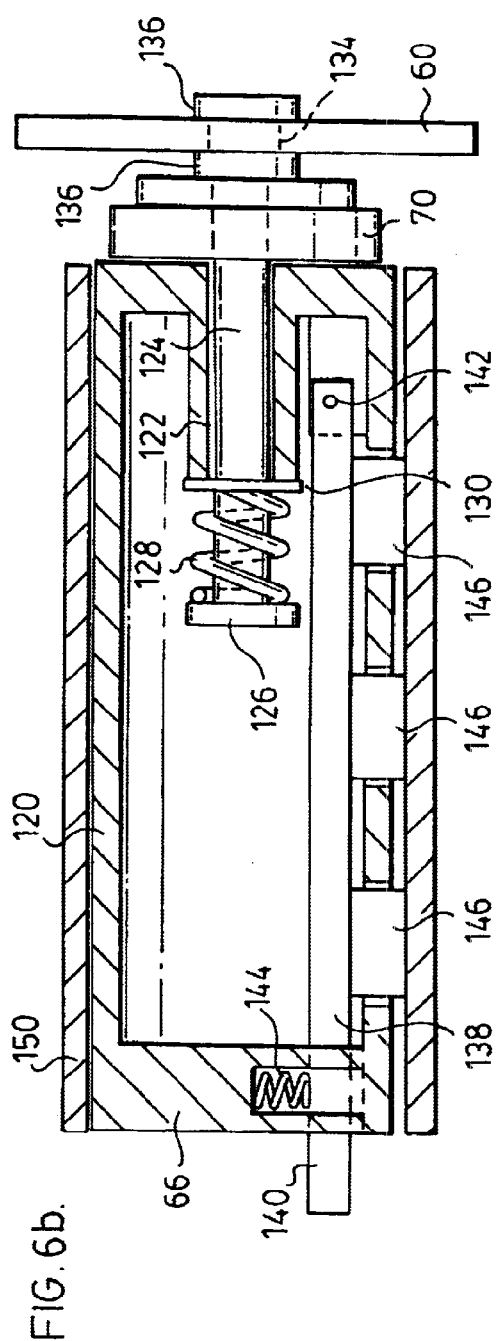
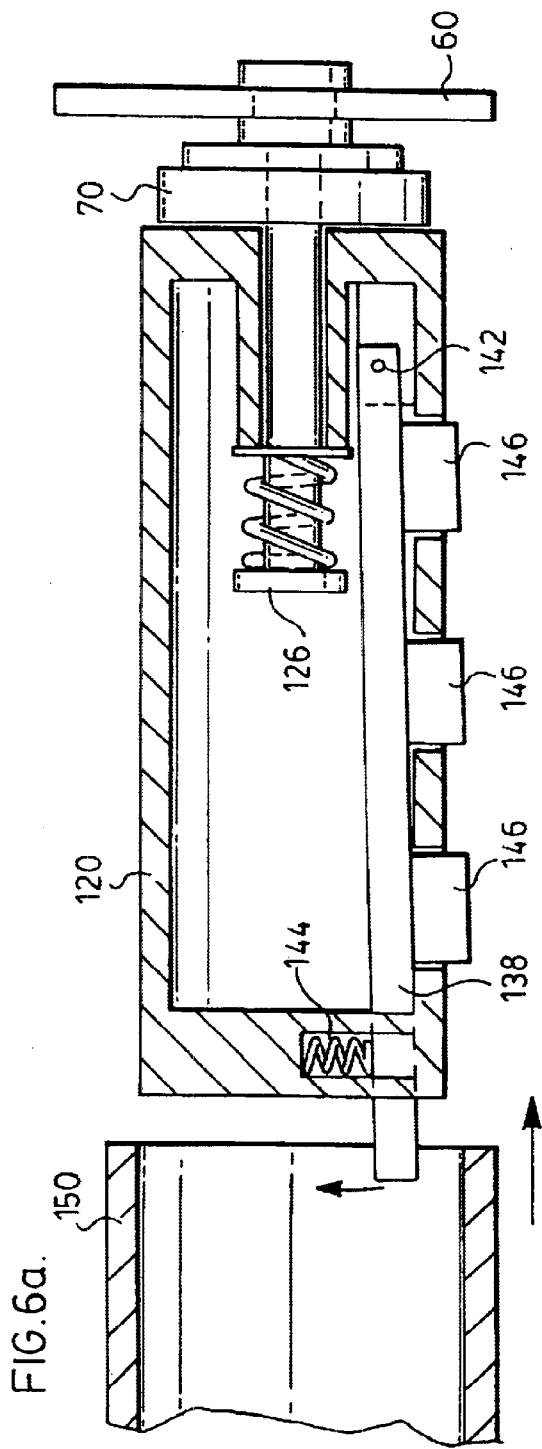
FIG.6b.
FIG.6a.

METHOD OF APPLYING A PROTECTIVE FILM, OPTIONALLY INCLUDING ADVERTISING OR OTHER VISIBLE MATERIAL, TO THE SURFACE OF A HANDRAIL FOR AN ESCALATOR OR MOVING WALKWAY

FIELD OF THE INVENTION

This invention relates to handrails for escalators and moving walkways, and more particularly is concerned with applying a protective film, optionally including advertising or other visible material, to the surface of such a handrail.

BACKGROUND OF THE INVENTION

Advertisers continually seek out new locations to place advertisements. It has been recognized for sometime that various forms of mass transit and the like offer good opportunities for advertising. Necessarily, mass transit systems offer a large potential audience, and a relatively small number of well positioned advertisements can be seen by a large number of people. Travelling on mass transit is usually fairly time-consuming and hence travellers of such systems often have plenty of time to view and read advertisements, which also make such advertising attractive to businesses. This has been well recognized in the past, and advertisers have sought various locations for placing advertisements.

Escalators and moving walkways are a common component of many mass transit systems, and are also found in numerous other locations with a high level of pedestrian traffic, e.g. large office buildings, shopping malls, large stores and the like. While travelling on an escalator is relatively quick compared to, say, a subway journey, an escalator ride nonetheless presents a potential audience for advertisers. While a ride on an escalator is relatively short, it is certainly long enough for a rider to notice and read an advertisement. Moreover, it is not really practical for an escalator rider to do anything else while riding the escalator, such as read a book or newspaper.

Advertisers have long recognized this, and it is common on well-used escalators to find various advertising panels. Thus, conventional poster advertising is often found lining the walls of escalator shafts. Additionally, advertisers have sought to place smaller, poster-like advertisements on smaller panels on top of the strip separating balustrades of up and down escalators. Commonly, advertisements would be placed on both sides, so as to present advertisements to riders on both the up and down escalators.

Ingenious advertisers have sought other ways of advertising on escalators. Thus, it has occurred to others that advertising could be placed on escalator handrails. This is attractive, since an escalator handrail presents an otherwise unused surface. As for grasping any object, a rider on an escalator will instinctively first look at the handrail to locate it. This ensures that the handrail, more often than not, will be at least glanced at by each user or rider. This makes it attractive for simple advertising, e.g. well known company logos and other advertising devices.

Thus, published Japanese application 57-130883 discloses a proposal for providing individual decals or stickers intended to be placed at regular intervals on an escalator handrail. These stickers include some sort of adhesive and a first film, and print ink applied to the rear of the first film. The disadvantage with this proposal is that it requires each of these stickers or decals to be placed individually and discretely on the handrail. This is difficult, time-consuming and care would be needed to ensure that they are accurately and uniformly aligned. Moreover, each individual sticker would present a number of edges which could be caught, tending to remove it. Thus, its forward and trailing edges would present edges which could be readily caught by elements of the handrail drive mechanism. It would be appreciated that accidental removal of an adhesive sticker by the drive mechanism, so that the sticker then becomes entangled in the drive mechanism, is highly undesirable. Additionally, these edges, together with side edges of the decal would be readily visible to users, and it is believed that many users or riders of an escalator would, either deliberately, or absentmindedly, tend to pick at these edges and lift them up. This would either tend to remove each sticker or render it more susceptible to accidental entanglement in the drive mechanism.

An alternative proposal is found in Canadian patent 1,304,035 (Andrew B. French). This proposes a relatively complex construction which would require wholesale redesign of the structure of an escalator handrail. It proposes a handrail provided with some sort of a slot or the like and a transparent cover. Advertising material is then placed between the transparent cover and the main body of the handrail. This would, in theory, overcome some of the disadvantages of the Japanese proposal. Unfortunately, this proposal totally fails to address the structural requirements of an escalator handrail. A handrail is subjected to considerable stresses and strains, and one cannot simply remove substantial sections of the handrail cross-section without addressing the structural considerations.

For example, a transparent cover could be subject to substantial tensile and/or compressive stresses, depending on the drive mechanism, and this issue is not addressed. Necessarily, this proposal requires complete replacement of each escalator handrail with one according to this invention, if advertising is to be applied.

SUMMARY OF THE INVENTION

A further consideration is that in many situations it may be desirable simply to provide some form of protective cover to an escalator handrail, and this is not addressed by any of the prior art proposals outlined above. First, many escalator handrails, after a period of use can develop a dull, worn appearance. Additionally, they may accidentally have various marks or discolourations on the surface, due either to the drive mechanism or the actions of users. For some situations, eg. in luxury hotels, resorts and the like, it is desirable that escalator handrails present a good appearance. Refinishing the surface of a handrail is not practical. It is therefore desirable to provide some way of applying some sort of a film to an escalator handrail, which can present a new appearance or finish to the handrail.

Accordingly, it is desirable to provide a film which can be readily applied in situ to an escalator handrail. Such a film should be capable of providing one or both of: a new, refinished appearance to the handrail; and advertising messages or logos.

Preferably, the film should be capable of application readily and simply, with minimum interruption in normal operation of the escalator. This should be achievable without requiring removal or replacement of the handrails.

Additionally, the inventors have realized that this covering should be sufficiently continuous, so as to minimize edges, etc which can promote accidental removal or entanglement in the drive mechanism. Further, this should be such as to minimize the opportunities for users to remove the surface finish or covering.

The invention is based on the concept of providing a film to the surface of the handrail, which film is both continuous and is removable.

The handrail may be a moving handrail, such as on a moving sidewalk or escalator handrail or a stationary handrail, such as would be found in a stairwell. This film comprises a first film layer with a first layer of adhesive on the underside of the first layer. Optionally, a second film layer with a second layer of adhesive is provided, bonding the second film layer to the top of the first layer. The film is elongate, i.e. substantially continuous and of a uniform width adapted for mounting to a handrail. This film may optionally include a layer of printed matter on top of the first layer. A release sheet layer of the same width as the film may optionally be included to protect the first adhesive layer prior to installation. The first and second layers preferably comprise polyurethane with a thickness of 3 mil (0.003") and the adhesive layers comprise an acrylic-based adhesive with a thickness of 1 mil (0.001").

In accordance with a second aspect of the present invention, there is provided an elongate handrail in combination with a flexible film as described by the first aspect of the invention. Where the handrail is a moving handrail, the end portions of the film may overlap one another to form a spliced joint. The film may extend around the handrail and cover part of the shoulders of the handrail. For a fixed or stationary handrail, the ends of the film can simply wrap around ends of the handrail, so as not to be readily visible to a user.

There is also disclosed an apparatus for applying an adhesive, flexible film to a moving handrail. Again, the handrails, to which this aspect of the invention can be applied, include moving handrails for moving sidewalks and escalator handrails. The apparatus comprises a mounting means for mounting the apparatus to a balustrade, a first spindle means for mounting a roll of film, and a means for applying pressure to the film to cause the film to be adhered to the handrail, whereby in use, the handrail may be driven past the apparatus, causing the film to be unrolled from the roll with the means for applying pressure causing the film to adhere to the handrail. The means for applying pressure may comprise at least one roller. The apparatus may allow for the adjustment of the position of the spindle relative to the mounting means. The mounting means can comprise suction cups for vacuum attachment of the apparatus to a smooth surface or balustrade or it may comprise clamping means for clamping the apparatus to the balustrade.

It is possible that the adhesive used will not require a release sheet, and that the film could be unwound in the same manner as many commercially available adhesive tapes. Where the nature of the adhesive does require a release sheet, the apparatus may further comprise a second spindle means and a second roll for taking up a release sheet is mounted on it in use, and a drive means between the first and second spindle means. The unwinding of a film from the first spindle then causes the drive means to drive the second spindle which takes up a release sheet separated from the film leaving the roll. The drive means may comprise a gear train. The gear train can include a ratio of speeds between the first and second spindle such that the second spindle means is driven at a faster speed than required to take up the release sheet. The apparatus then includes clutch means on at least one of the two spindle means to ensure that the tension does not become too great so as to cause the release sheet to snap, and this can then maintain a uniform tension in the release sheet.

The apparatus may include a longitudinally extending member as a main body of the actual application for applying the film, and the first and second spindles may be attached to a swing arm pivotally mounted on the longitudinally extending member. A main roller may be included in the means for applying pressure and pivotally mounted with respect to the longitudinally extending member. The main roller may be biased against the top of the escalator handrail by means of a spring.

The adjustment means may comprise pivot and sliding connections.

The means for applying pressure may include a pressing mechanism including a plurality of rollers mounted symmetrically about the centre line of the means for applying pressure corresponding to a centre line of a handrail. The rollers may extend from the forward end of the pressing mechanism (the forward end corresponding to the forward motion of the handrail) to the rearward end of the roller means. The pair of rollers at the rearward end of the roller means are mounted adjacent to the center line of the apparatus and the successive pairs of rollers are mounted progressively further apart. As the moving handrail is passes through the pressing mechanism, the film is progressively wrapped around the outer surface of the handrail.

The film of the present invention is applied in accordance with a method detailed below Again, references to escalator handrails are to be understood to including handrails for moving sidewalks. The first step is to provide a flexible film comprising a first film layer and a layer of adhesive on the underside thereof, wherein the film is generally elongate and having a width corresponding to the width of the handrail. The film is then aligned to the handrail and the first end of the film is adhered to the surface of the handrail. The handrail is the driven with respect to the film to cause the film to progressively and continuously adhere to the handrail. Finally, the full width is uniformly and smoothly adhered to the surface of the handrail.

The method may include providing the film on a roll and mounting the roll on a spindle adjacent to the handrail. A roller may then be applied to the surface of the handrail to press the film against the handrail. The method may further comprise progressively wrapping the film around the lips of the handrail by means of pairs of rollers mounted further apart around the outside of the handrail. The method may further involve the use of an apparatus as mentioned.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention and in which:

FIGS. 2a and 2b are side views of the apparatus of FIG. 1, in different positions;

FIG. 4 is a perspective view showing the apparatus in use on a balustrade of an escalator corresponding to FIG. 3a;

FIGS. 6a and 6b are detailed views of a spindle for mounting a roll, for either the film or the release sheet;

DESCRIPTION OF THE PREFERRED EMBODIMENT

Figure 1:
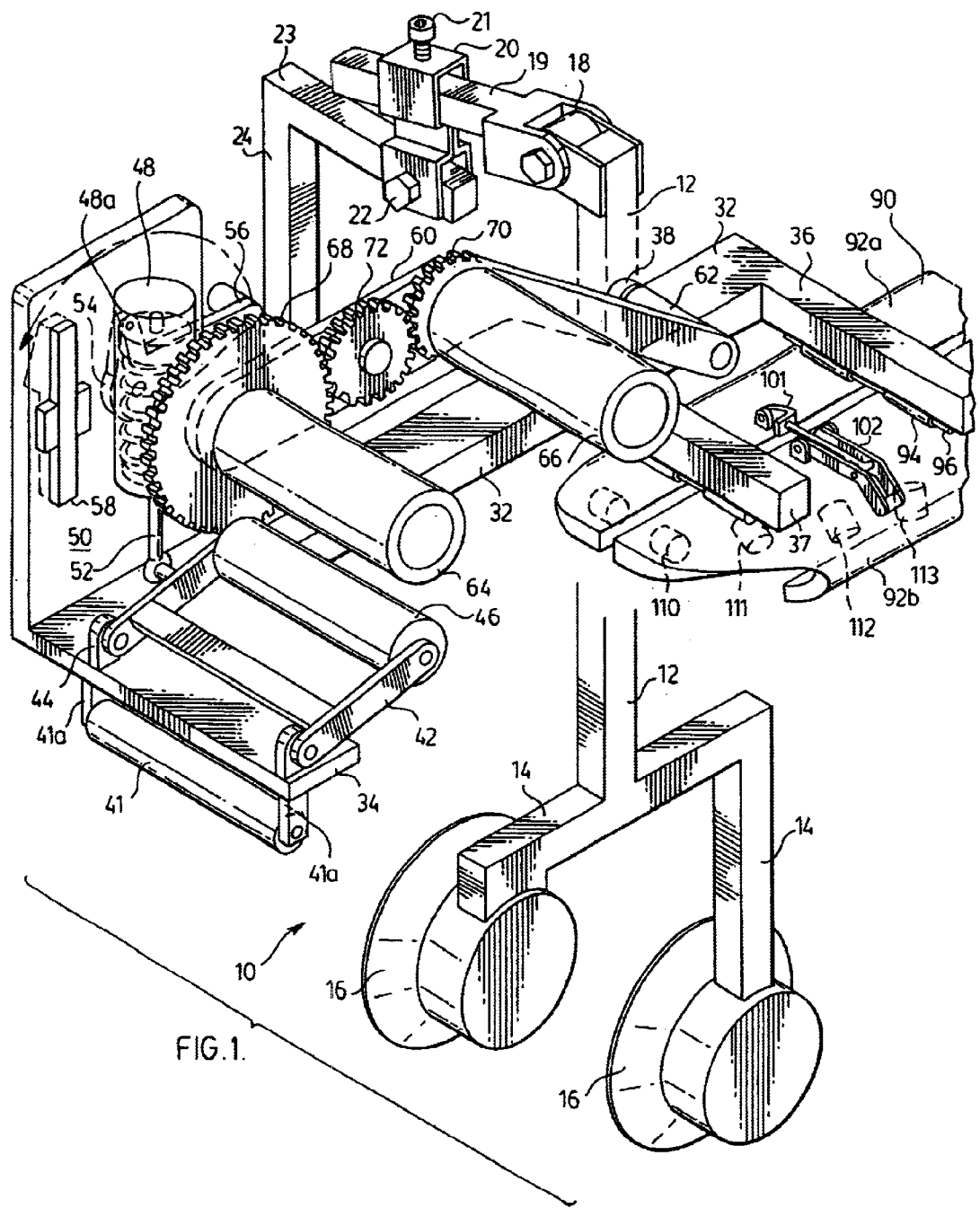
FIG. 1 is perspective view of an apparatus in accordance with the present invention for applying a film to an escalator handrail.
Figure 3A:
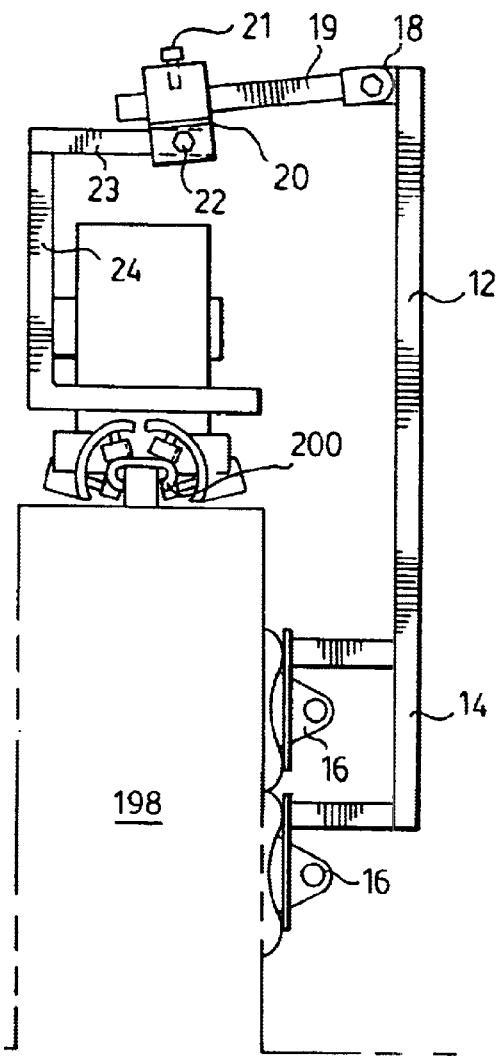
FIGS. 3a and 3b are views along the length of a handrail, showing alternative mounting arrangements.

Referring first to FIGS. 1 and 3a, an apparatus in accordance with the present invention is indicated generally by the reference 10. The apparatus 10 includes a main support member 12, of tubular, square cross-section. The support member 12, at its lower end is of inverted T-shape and includes two downwardly extending portions 14 of different lengths. At the lower end of each portion 14, there is mounted a suction cup 16. If required, the support member 12 can be offset laterally (FIGS. 3a, 3b), to locate the apparatus in the desired position relative to a handrail.

At the upper end of the support member 12, there is a pivot connection 18, providing a connection to a first cross member 19. In known manner, the pivot connection 18 includes overlapping flanges secured to the members 12, 19, and a nut and bolt adjustable to clamp the flanges together.

Mounted on the first cross member 19 is a sliding swivel joint 20 which includes a bracket slidable along the first cross member 19. A threaded screw member 21 enables this bracket to be clamped relative to the cross member 19.

The bottom end of the bracket of the swivel joint 20 includes a second pivot connection 22 to a second cross member 23. Similarly, this pivot connection 22 can be locked or secured by means of a nut and bolt arrangement. A downwardly extending member 24 extends from one end of the second cross member 23.

Figure 3B:
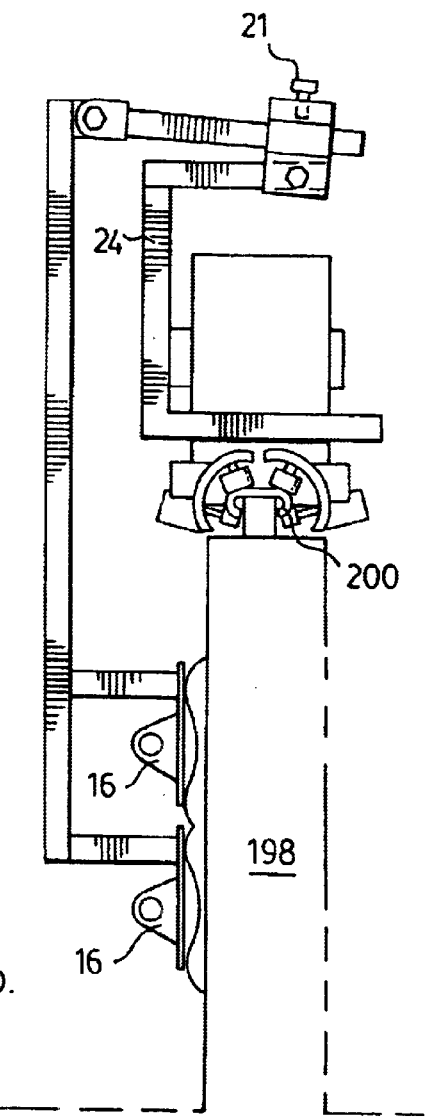

The overall arrangement of the members 12, 19, 23 and 24, the pivot connections 18 and 22 and the sliding swivel joint 20 is to provide desired degrees of freedom for the lower end of the downwardly extending member 24, both vertically and horizontally, i.e. in the plane of FIGS. 3a and 3b. As the actual applicator of the present invention (to be detailed below) is mounted at the lower end of the member 24, this enables the applicator to be adjusted to a desired location relative to a handrail. Thus, the pivot connections 18, 22 enable the vertical location to be adjusted, and this adjustment will necessarily cause some lateral or horizontal movement of the lower end of the downwardly extending member 24. The sliding joint along the cross member 19 enables the horizontal location to be adjusted.

FIGS. 1 and 3a show one mounting arrangement, in which the cross members 19, 23 have their free ends extending in general opposite directions. In an alternative mounting arrangement the vertically oriented members 12, 24 are located close together, with the free ends of the cross members extending in the same direction away from the members 12, 24.

In general, the apparatus will always be mounted on the inside surface of a balustrade 198, and often, the balustrade will not present an accessible outer surface. Thus, both the arrangements of FIGS. 3a and 3b will be required for the two handrails on either side of an escalator or moving walkway.

The lower end of the downwardly extending member 24 is connected to a longitudinally extending member 32 (this is described as longitudinally extending, in relation to the escalator handrail, as will become clear from the description below), which forms a main body of the actual applicator for applying the film.

A rearward end of the member 32 is secured to an L-shaped bracket 34. Further cross members 36, 37 extend perpendicularly out from the longitudinally extending member, at the middle and forward end thereof. A projecting lug 38 is mounted on and extends upwardly from the longitudinally extending member 32, between the cross members 36 and 37.

The L-shaped bracket 34 includes a horizontal element 40. A rear roller 41 is mounted on two lugs 41a extending downwards from the rearwards end of horizontal element 40. A small frame 42, comprising a pair of parallel and spaced side members and joining cross member, is pivotally mounted to two small lugs 44 projecting upwardly and forwardly from the front end of element 40. A roller 46 is rotatably mounted between the free ends of the side members of the frame 42.

Figure 2B:
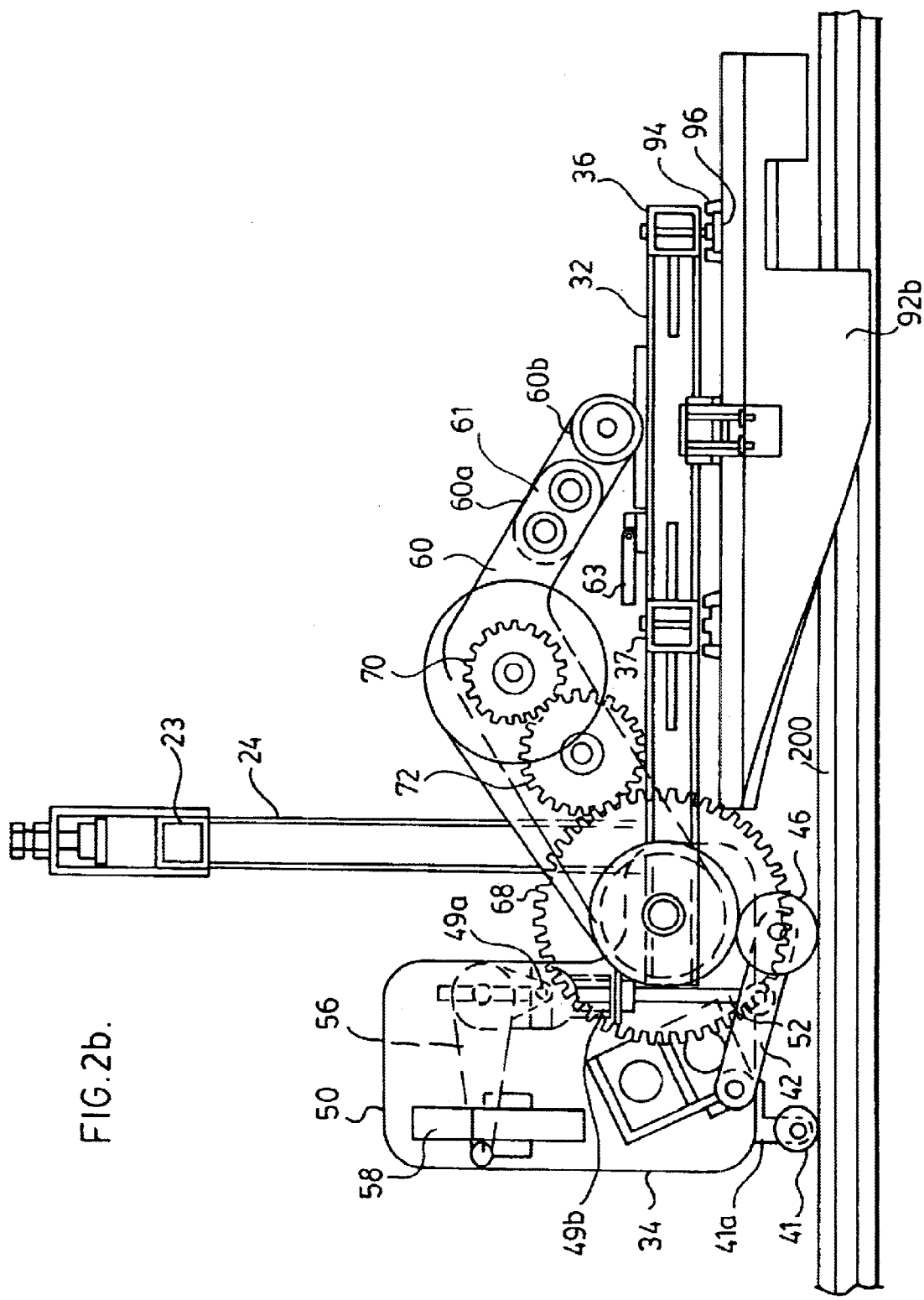

Referring now to FIGS. 1, 2a and 2b, to bias the frame 42, and hence the roller 46, downwards, there is provided a spring mechanism 47 mounted to a vertical element 50 of the L-shaped bracket 34. The spring mechanism 48 includes a helical coil spring 48a (FIG. 1), a plunger 52 and upper and lower discs 49a and 49b. The plunger 52 is pivotally connected at its lower end to a side projection from the frame 42. The bottom of the helical coil spring abuts the lower disc 49b, while the top end of the spring 48a abuts the upper disc 49a. The lower disc 49b is fixably mounted to plunger 52, while the upper disc 49a is slidably mounted on the plunger. The upper disc 49a is also pivotally attached to a vertically-directed crank member 54. Crank member 54 is attached via a crankshaft (not shown) to a horizontally-directed handle 56 on the opposite side of vertical element 50, with the crankshaft rotatably mounted in a bore of the element 50. When handle 56 is horizontal and pointing rearwards (as in FIG. 2b), the crank member 54 is pointing downwards, compressing the spring 48a. The compression of the spring 48a biases frame 42 downwards. Handle 56 is kept in place by means of ratchet 58. When the ratchet is released and handle 56 is rotated to a forward-pointing horizontal position, crank member 54 is pointing upwards, releasing the compression in the spring (as in FIG. 2a ). The ratchet 58 is pivotally mounted in an opening in the vertical element 50, so that it can be displaced away from the handle 56, to release the handle.

A swing arm 60 is pivotally mounted to the projecting lug 38 and includes a spacer element 62, so as to space the swing arm away from the longitudinally extending member 32, for reasons which will become clear below. Swing arm 60 may comprise two separate members 60a and 60b fixably attached via a joint 61. Swing arm 60 may be locked into a horizontal position as shown in FIG. 2a by means of a simple locking mechanism 63. Locking mechanism 63 is a simple L-shaped member where one end is pivotally mounted on longitudinally extending member 32. The other end abuts the bottom portion of the swing arm preventing the arm from falling. Swing arm 60 may be unlocked by pivoting the locking mechanism 63 away from swing arm 60.

First and second spindles 64, 66 are rotatably mounted to the swing arm 60, and details of the spindle 66 is given below in relation to FIGS. 6a, 6b.

The first spindle 64 is secured to a drive gear 68, while the second spindle is secured to a driven gear 70. An idler gear 72 is rotatably mounted to the swing arm, so as to engage both the drive and driven gears 68, 70. The drive gear 68 is substantially larger than the driven gear 70, so as to ensure that the second spindle 66 is driven at a faster speed than that of the first spindle 64.

The arrangement of the spindles 64, 66 and the roller 46 is intended to apply an adhesive film to the top surface of the handrail. To ensure that the film is applied uniformly around the side edges and at least partially underneath a handrail, a pressing mechanism 90 is provided. The pressing mechanism comprises a trough-shaped element 92 having first and second halves 92a, 92b. Each of the element halves 92a, 92b includes elements 94 that combine to form shallow slots or sleeves. Extending downwardly from each of the cross members 36, 37 is a support member 96 having, in cross-section inverted T-shape, so as to present edge portions engaging the sleeves formed by the elements 94. This mounts the trough-shaped element halves 92a, 92b, for sliding movement laterally, while otherwise limiting their movement.

Figure 8A:
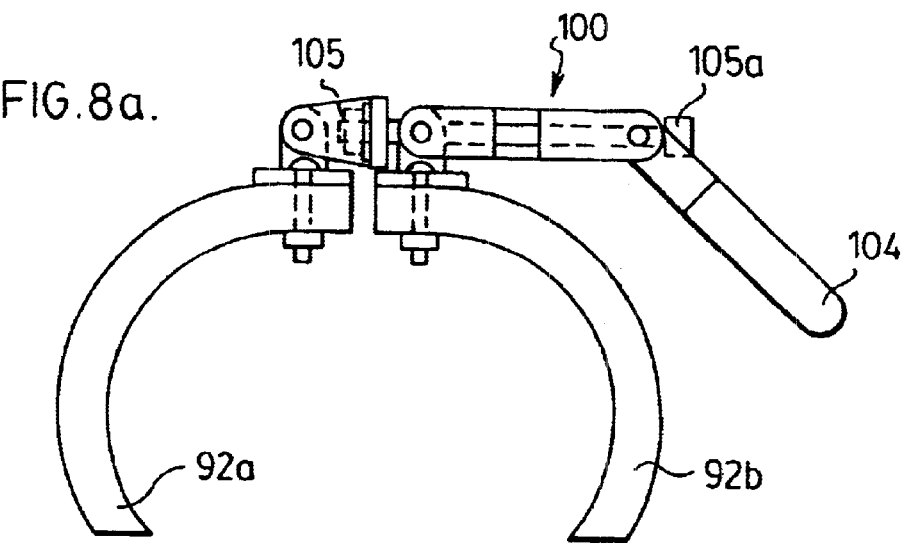
FIGS. 8a and 8b are cross-sectional views through a pressing mechanism, showing operation thereof.
Figure 8B:
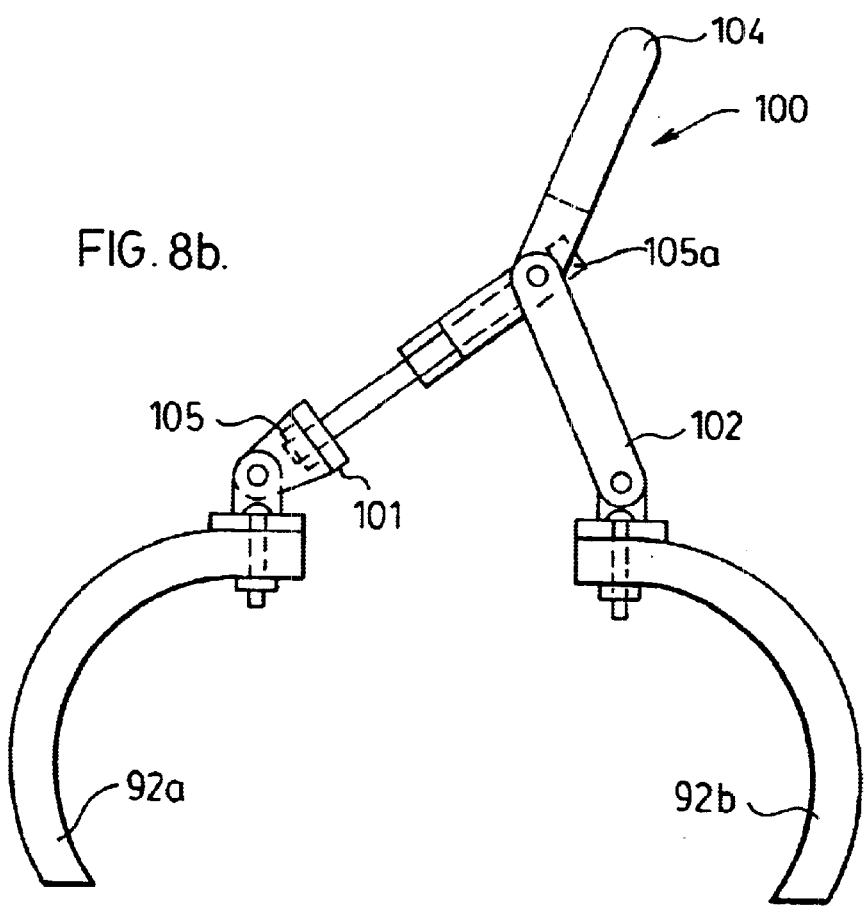
Figure 9A:
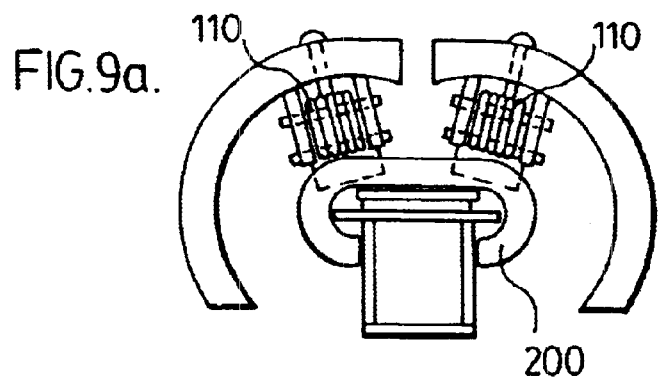
FIGS. 9a–9f are further cross-sectional views through a pressing mechanism, showing mounting of pressing rollers.
Figure 9B:
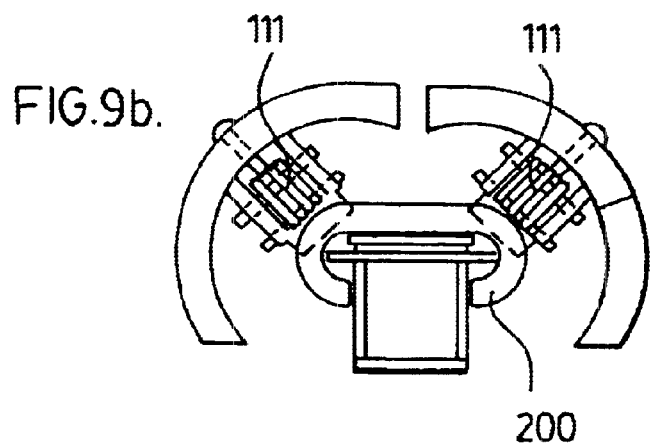
Figure 9C:
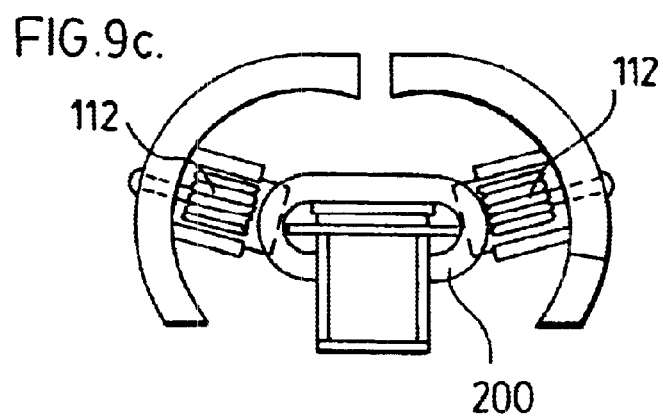
Figure 9D:
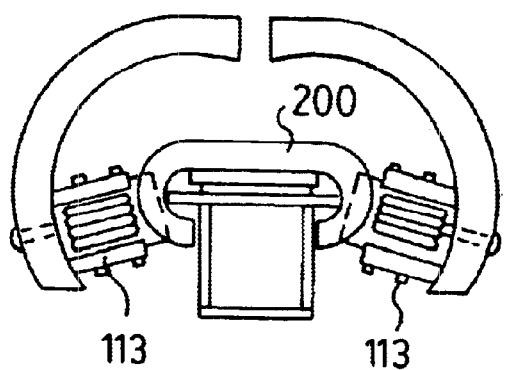
Figure 9E:
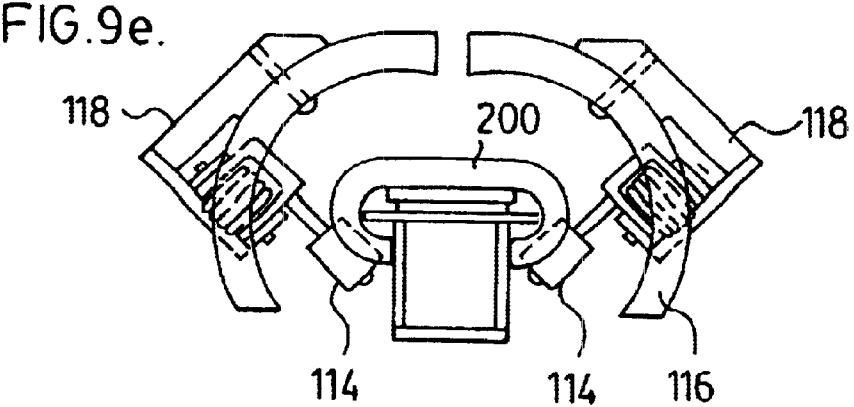
Figure 9F:
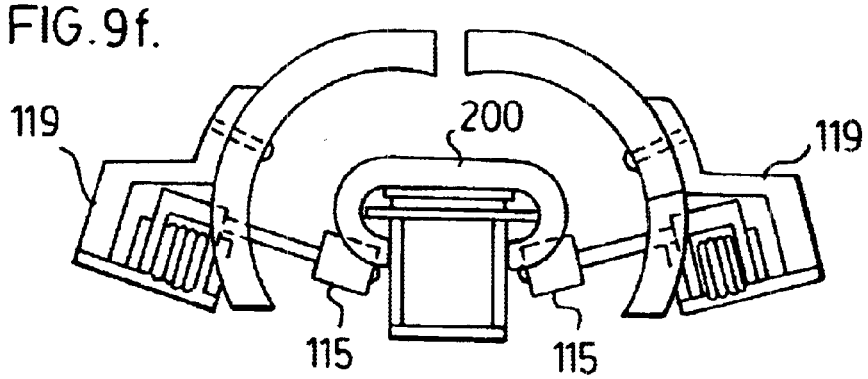

As best seen in FIGS. 1, 8a and 8b, an over-center mechanism 100 comprises a first arm 101 and a second arm 102 pivotally mounted to the trough-shaped element halves 92a, 92b respectively. The second arm 102 forms an obtuse angle and is formed from two generally parallel side members. The free end 104 of the second arm 102 provides an actuating handle. The first arm 101 is pivotally attached to the second arm 102, generally at the obtuse angle therein. In known manner, if the handle end 104 is raised and pivoted towards the longitudinally extending member 32, this causes the trough-shaped elements 92a, 92b to slide apart along the inverted T-shaped member 96 (FIG. 8b). When the handle end 104 is displaced to the position shown in FIG. 8a, then the trough-shaped halves 92a, 92b are drawn together to the position shown. The first arm 101 includes a nut 105 and bolt 105a assembly as shown in FIGS. 8a and 8b. The nut 105 is used to shorten the first arm 101. The shortening of the first arm 101 causes trough elements 92a and 92b to come closer together when in the closed position. This enables adjustment of the width of the trough 92 for handrails of different dimensions.

Figure 10:
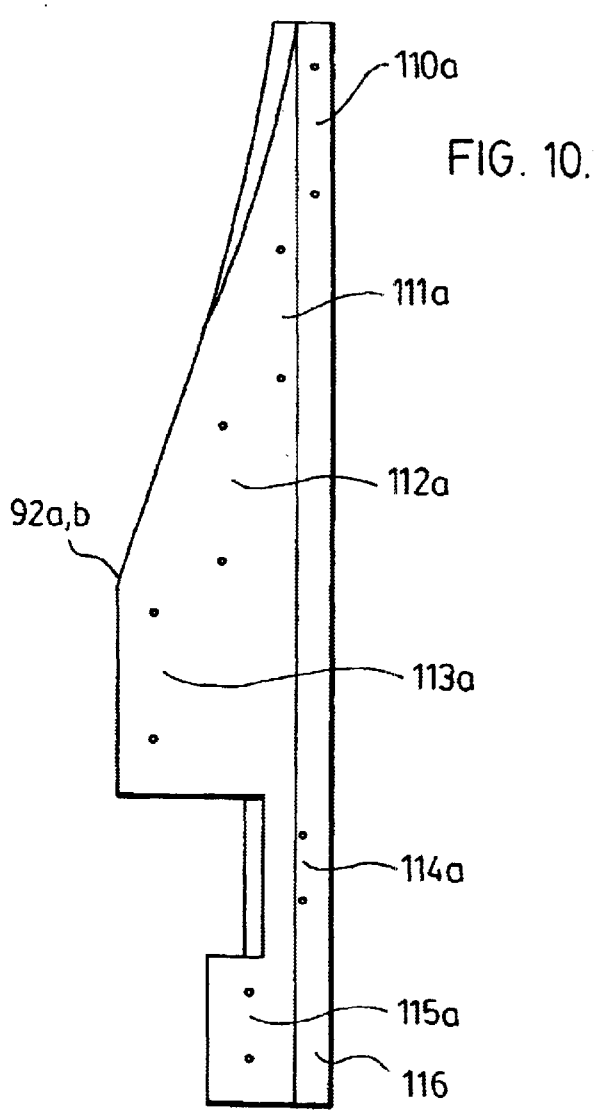
FIG. 10 is a side view of the pressing mechanism, showing details of one-half of the trough-shaped pressing mechanism.
Figure 11A:
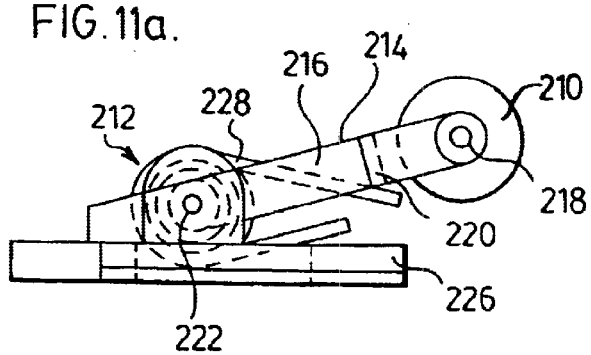
FIGS. 11a–11f are views showing details of the spacing mounting of the rollers of the pressing mechanism.
Figure 11D:
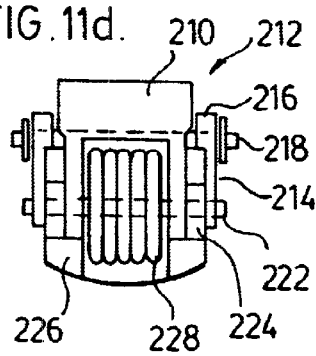
Figure 11B:
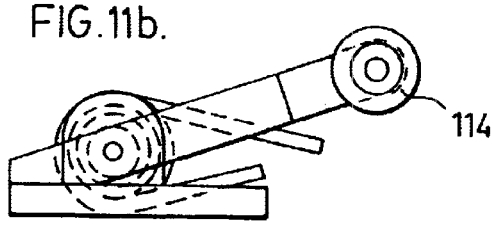
Figure 11E:
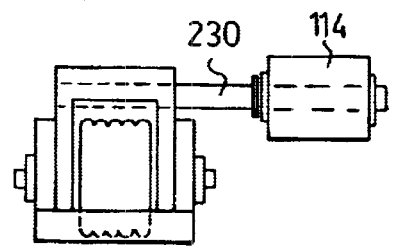
Figure 11C:
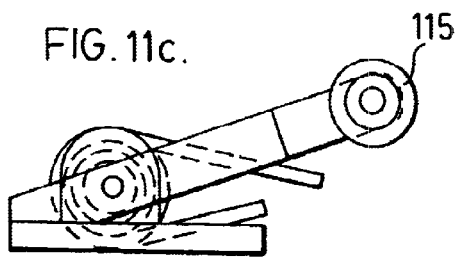
Figure 11F:
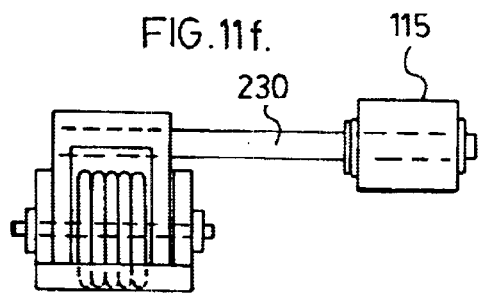

Referring now to FIGS. 1, 9a–9f, 10 and 11a–11f, a series of rollers 110, 111, 112, 113, 114, and 115 are rotatably mounted on roller mounting mechanisms inside each of the element halves 92a, 92b. Rollers 110–115 are mounted such that the rollers 110 are relatively close to the center line of the apparatus and to the center line of the handrail. Rollers 110 are mounted towards the rear of the element halves 92a and 92b at position 110a (FIG. 10). The other rollers 111, 112, 113, 114, and 115 are located progressively further away from the center line and progressively closer to the front of the mechanism at positions 11a, 112a, 113a, 114a, and 115a respectively, for progressively wrapping a film around the handrail. Rollers 110 to 113, shown generally as 210 on roller mounting mechanism 212 (FIGS. 11a, 11d), are mounted on a frame 214. The frame 214 comprises two side members 216 and three cross members 218, 220 and 222. The roller 210 is rotatably mounted on cross member 218. The frame 214 is pivotally mounted on two lugs 224 extending from the base 226 of roller mechanism. A helical torsion spring 228 is mounted on cross member 222. One end of the spring is pressed against the base 226 and the other end is pressed against cross member 220. Spring 228 thus acts to bias frame 214 and roller 210 inwardly towards handrail 200. The base 226 is mounted to a respective trough-shaped half 92a, 92b.

Referring mainly now to FIGS. 11b, 11c, 11e, and 11f, rollers 114 and 115 are similarly mounted within roller mounting mechanisms with some exceptions. First, rollers 114 and 115 have smaller diameters than rollers 110–113. As well, rollers 114 and 115 are spaced laterally away from spring 228 with spacing elements 230. Both of these differences are designed to allow the rollers to press the film against the shoulders of the handrail where space is limited.

As best shown in FIGS. 2, 9e, 9f and 10, the trough-shaped element halves 92a, 92b include a forward extension 116. Mounted to each of these extensions 116 are brackets 118 and 119. Rollers 114 are rotatably mounted to the first brackets 118 and rollers 115 are rotatably mounted to second brackets 119.

Reference will now be made to FIGS. 6a and 6b, which show details of a clutch mechanism for the spindle 66 and friction mounting mechanism for both spindles 64, 66. Each of the spindles 64, 66 includes a rotatably mounted spindle body 120, each of which is attached to a respective gear 68, 70. However, only spindle 66 includes the clutch mechanism.

The spindle body 120 of spindle 66 includes an internal tubular bearing 122 mounted on a shaft 124. The shaft 124 has an enlarged head 126. A helical coil spring 128 is mounted between the enlarged head 126 and a washer 130 abutting the end of the bearing 122. The coil spring 128 presses the spindle body 120 against the gear 70 mounted on the shaft 124.

The shaft 124 extends through a bearing hole 134 in the swing arm 60, and washers 136 are provided on either side of the swing arm 60. The washers 136 are secured to, or integral with the shaft 124.

Within the spindle body 120, there is a lever 138 including a projecting lever end or actuation portion 140. The lever 138 is pivotally mounted at 142 and a spring 144 biases the lever radially outwards. Bearing projections 146 extend radially out through openings in the tubular spindle body 120.

Accordingly, in use, as shown in FIG. 6a, to mount a roll 150 for taking up a release sheet from a film, the lever end 140 is pressed radially inwards, to bring the projections 146 radially inwards. This permits the roll 150 to be slid onto the spindle 66. With the roll 150 in position, the lever 138 can be released. Then, the spring 144 acts to press the bearing projections 146 against the inside of the roll 150 securely mounting the sleeve. Torque can then be transmitted between the sleeve 150 and the spindle body 120.

The arrangement of the spring 128 and related elements of the spindle 66 acts as a clutch to limit torque transmission between the tubular spindle body 120 and the shaft 124. In particular, the drive ratio required between the two spindles 64, 66 will vary as the size of the rolls on the two spindles varies. It is impossible to maintain a completely accurate ratio at all times. Accordingly, the ratio between the drive and driven gears 68, 70 is such as to ensure that, at a minimum, the second spindle 66 is driven at a slightly faster speed than required, for all effective sizes of rolls on the spindles 66 (the effective size being the diameter of the roll at any instant including material wound on it). Then, any excess speed is, effectively, dissipated by the clutch mechanism in the spindle 66. In use, this will maintain a constant torque tending to wind up the release sheet.

Reference will now be made to FIGS. 4, 5, 7, 8, 12 and 13 to describe a preferred film configuration and method of using the apparatus of the present invention.

Figure 12:
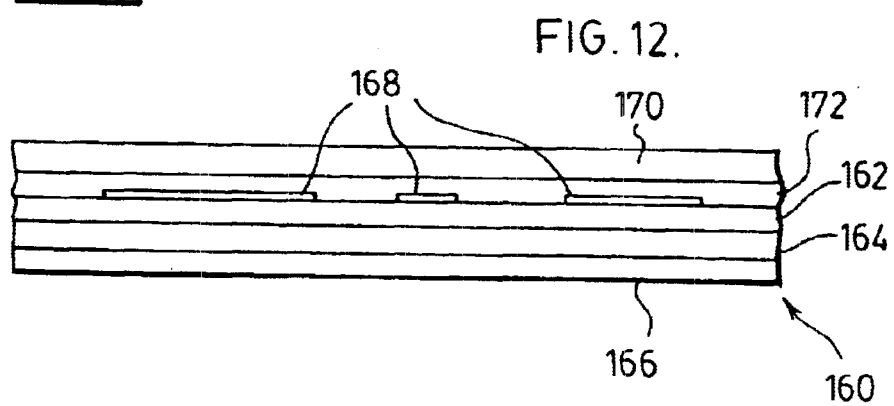
FIG. 12 is a cross-sectional view through a film according to the present invention.

Referring first to FIG. 12, there is shown, schematically, a cross-section of a film in accordance with the present invention. This cross-section is shown transverse to the longitudinal direction of the handrail. This film is indicated at 160 and comprises a first film layer 162 with a first adhesive layer 164 on the underside thereof. To protect the film until this is applied and to enable the film to be wound up onto a sleeve 150, a release sheet 166 is provided in known manner.

On top of the first first layer 162, printed matter is provide as indicated at 168. This printed matter can be text, logos, images, etc., and it is expected that it will often comprise a repeated pattern. Shown schematically, this printed matter would have a negligible thickness, so as not to significantly affect the thicknesses of other layers. This printed matter 168 is printed directly onto the top of the first film layer 162.

Following application of printed matter 168, a second layer 170 with a respective second layer of adhesive 172 is applied to the top of the first sheet, so as to sandwich the printed matter 168 between the two film layers 162, 170. This serves to protect the printed matter (for brevity, the film layers 162, 170 are preferred to below simply as first layer 162 and second layer 170).

Each layer 162, 170 is preferably a polyurethane film having a thickness of 3 mils. The film is preferably a high-gloss, clear flexible film, coated with a clear acrylic pressure-sensitive adhesive. These films are provided with a release liner. Thus, once the top of the first layer 162 has been printed, the second layer 170 with this associated adhesive 172 as the release liner or sheet removed and is then applied to the top of the first layer 162 to form the combined film 160 shown in FIG. 8.

The width of the film as supplied is commonly several feet. For the present purposes, it would be cut to widths depending upon the particular handrail application.

While it is expected that the first and second layers 162, 170 would both be clear, for some applications, it may be desirable to colour the second layer 170. Thus, the second layer 170 could be a solid, uniform colour to provide a suitable background to advertising material or a manufacturer's logo, and this colour could be a colour associated with the particular product or manufacturer. Additionally, the first layer 162, if desired, could be provided with some tinting.

Another aspect of the invention is the use of a film simply to protect a handrail for an escalator or moving walkway. For this purpose, the film 160 could have a single layer. For such an application, the second layer 170 and its adhesive 172 could be omitted. For completeness, it is noted that, conceivably, in such applications, some printed material could still be provided on the top of the first layer 162, but such printed matter would not then be protected, and would likely by subject to excessive wear, marking, etc. during passage through the handrail drive mechanism.

Figure 13:
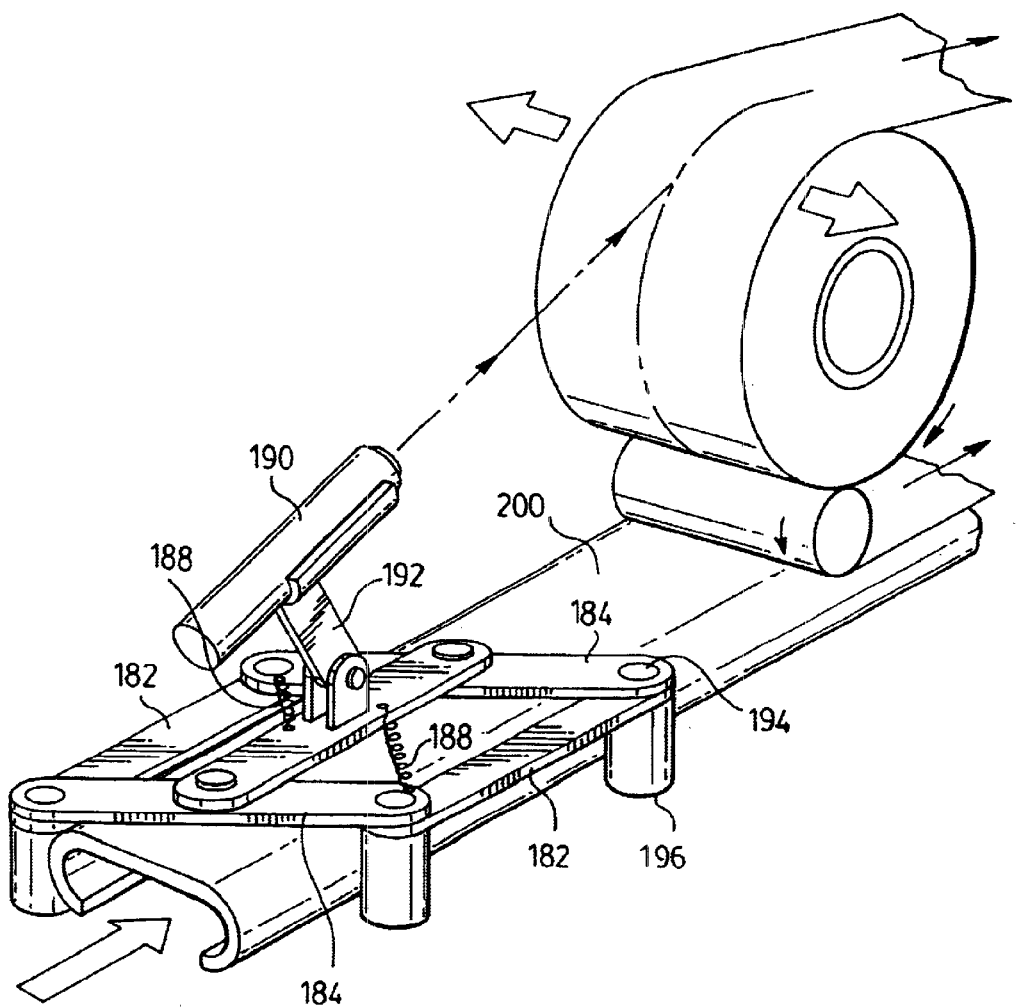
FIG. 13 is a perspective view of a mechanism for aligning the apparatus of the present invention.

Reference will now be made to FIG. 13, which shows an alignment mechanism 180, which essentially comprises a five-member pivoted parallelogram mechanism. The mechanism 180 comprises a pair of side elements 182, pivotally attached to a pair of transverse elements 184 a central element 186 extends longitudinally, parallel to the side elements 182, and is pivoted to the transverse elements 184. Tension springs 188 may be omitted. If the springs 188 are omitted, it is a simple matter to hold the unit by hand and provide the closing tension required to center the mechanism mounted between the central element 186 and ends of the transverse elements 184. The tension springs 188 act to bias the side elements 182 together, tending to collapse the parallelogram formed by the elements 182, 184.

Mounted on the central element 186 is a light source 190, here a laser. The laser 190 is mounted in a bracket 192 pivotally mounted to the central element 186.

Pivot connections between elements 182,184 are formed by pivot pins, one of such is indicated at 194. Each pivot pin 194, beneath the respective side element 182 is provided with a cylindrical collar 196.

A description will now be given of the use of the equipment of the present invention. Firstly, before a film is applied to a handrail, the handrail must be properly prepared. Most handrails, after a period of use, will acquire a film of dirt and grease, preventing proper adherence of an adhesive film.

Accordingly, the handrail is first washed with a solvent, preferably an EH-101 solvent blend to remove all dirt and grease. EH-101 solvent blend is composed of ethyl acetate, naphtha, toluene and benzene. For this purpose, operators should wear rubber gloves and use appropriate applicators.

The handrail is then inspected for gouges or defects that impede application. If deep gouges are present, the handrail may need to be replaced before the film is applied.

Any deep stains or marks can be removed with a scrub pad and EH 101 solvent blend.

The handrail is cleaned by first cleaning an exposed run of the handrail, and both handrails of an escalator or moving walkway could be cleaned simultaneously. Each run is then marked with a china marker.

The drive mechanism of the escalator is then used to jog the escalator and its handrail, to the end of the marked and cleaned areas, to expose further stretches of the handrails. This procedure is repeated, and until the entire length of both handrails of an escalator are cleaned.

Once clean, the handrail is coated with a sealant, to reduce slightly the adhesive bond between the film and the handrail. This ensures that the applied film can be peeled off readily. An appropriate sealant is applied as specified, generally as a thin film. The film of sealant is buffed to a smooth, shiny finish. Again, the handrails on two sides of an escalator can be treated simultaneously. The handrails are marked with a china marker to indicate areas that have been sealed, and then jogged forward using the escalator drive mechanism; this is repeated until both handrails are treated and sealed.

To provide a film for an escalator, two matched rolls of film are provided, one for each handrail. The handrails have the film applied separately. Theoretically, it may be possible to apply both films simultaneously, but this is usually not practical. It has been found that application of the film needs to be monitored carefully, and, on occasion, adjustments and the like are required. To monitor two films simultaneously would be difficult.

For an escalator, an operator is provided with two matched rolls of film, one for each handrail; the handrail is indicated at 200 and its balustrade at 198 in the drawings, while the rolls of film are indicated at 174. First, the operator should confirm that the correct rolls 174 are present for the particular site or escalator. The wind configuration of the rolls should be checked. Commonly, most advertising material should be viewed from one direction, and should be applied in the appropriate orientation, for each of up and down escalators.

Figure 4:
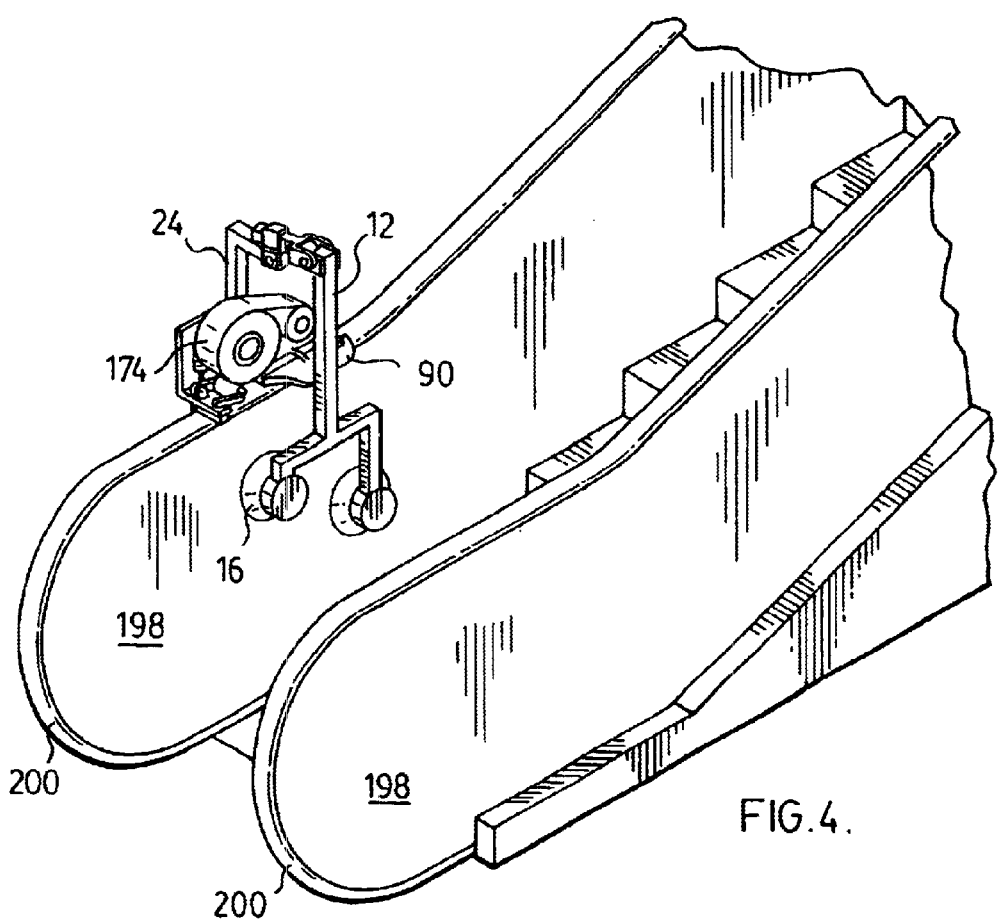
Figure 5:
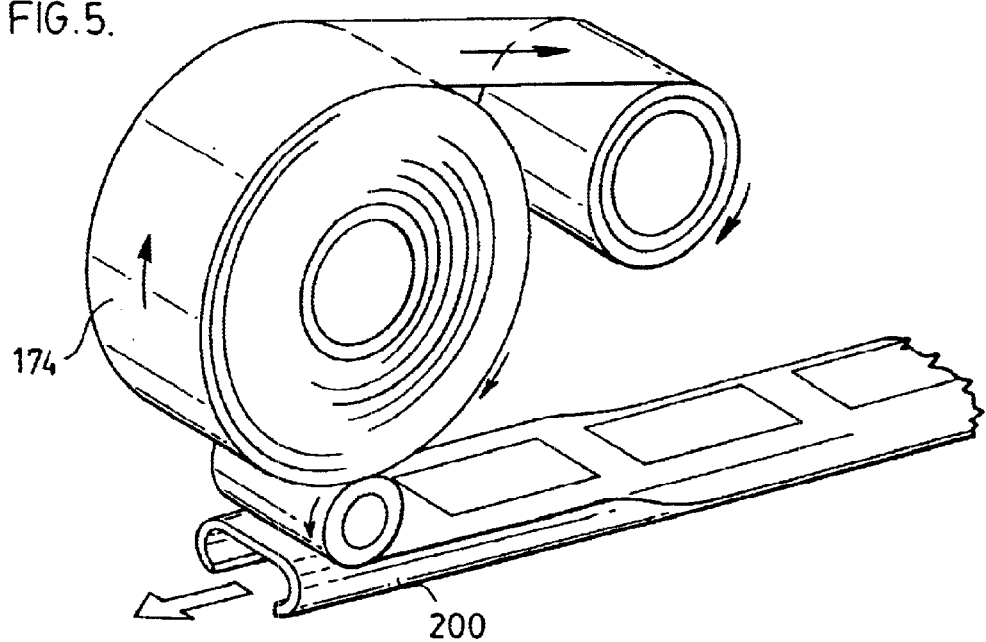
FIG. 5 is a perspective view showing the detail of motion of the film and a release sheet showing application of film to an escalator handrail.

The apparatus 10 is then mounted to the balustrade 198, shown in FIGS. 3 and 4, with just the support member 12 attached, i.e. with the cross member and attached components removed. The apparatus 10 is preferably mounted at the top of the escalator for down escalator units and at the bottom of the escalator for up escalator units. On installations where obstacles prevent mounting at these locations, it is permissible to attach the apparatus 10 away from the ends on a straight, sloped portion of the handrail.

The vacuum cups 16 are pumped up, in known manner, to securely mount them to the balustrade. With the support member 12 securely mounted, the rest of the apparatus or the applicator is mounted by sliding the swivel joint 20 onto the first cross member 19, in accordance with FIG. 3a or FIG. 3b as required.

The swing arm is raised into the retracted position with the locking mechanism 63. A roll of film 174 is then mounted on the first spindle 64. This is mounted as shown in FIGS. 6a and 6b and as detailed above.

The apparatus 10 is mounted on the balustrade 198 with the trough-shaped pressing mechanism 90 in the open configuration (FIG. 8b). The pressing mechanism 90 is then closed. With the pivot connections 18, 22 and the sliding swivel joint 20 loosened as required, the horizontal and vertical position of the apparatus is adjusted. The rear roller 41 and rollers 110–115 serve to ensure that the apparatus is accurately located relative to the handrail. If required, the nut and bolt assembly 105, 105a is adjusted. With the apparatus properly located, the pivot connections 18, 22 and the sliding swivel joint 20 can be locked. Final angular adjustment is achieved using a bubble level.

Alignment and clearances should then be checked. The alignment can be checked using the mechanism shown in FIG. 15. For this purpose, the center line of the release sheet 166 is measured and marked with a ruler and pen, or the release sheet can be provided with a preprinted center line. First, side elements 182 of the alignment mechanism 180 are grasped and displaced sideways and the mechanism 180 fitted onto the handrail 200. The side elements 182 are then released, so that the springs 188 cause the mechanism 180 to snugly abut the sides of the handrail 200. This will automatically align the laser 190 with the center of the handrail. The angular position of the laser 190 can be adjusted if desired.

The position of the laser beam relative to the center line mark will indicate whether roll 174 is properly aligned. If necessary, the roll position can be adjusted, depressing spindle lever 140 to release the spindle tension and sliding roll 174 until the mark and laser coincide. The laser guide is then removed from the handrail.

The swing arm 60 is locked in place using locking mechanism 63 and the pressing mechanism 90 is opened. The roller 46 is placed in the retracted position as shown in FIG. 2a by turning handle 56 to the forward direction. This causes the crank member 54 to point upwards and the roller 46 to lift above the handrail. With roll 174 in place, the end 160a of the film is fed around the retracted roller 46 and pulled manually through the open press mechanism 90 and directed along the length of the handrail. The tail end of the film is wrapped around the sides of the handrail, after peeling back a corresponding length of the release sheet 166. The adhesion at this point allows for wrinkles and air pockets. The pressing mechanism 90 is then closed and release sheet 166, peeled off the film 190, is directed around and above the roll 174 and secured by tape to a take up roll 178. The roll 178 is mounted on the spindle 66. The crank is released from the ratchet 58 and rotated 180° and the crank member 54 now points downwards relative to the crankshaft and the roller 46 is pressed by the spring into contact with the handrail 200 (FIG. 2b). The swing arm 60 is then unlocked so that the roll 174 abuts and tracks against roller 46. The weight of the swing arm adds to the force applied to the film during application.

Once the film 160 contacts the handrail 200, this can be jogged a short distance, to establish the thread-up and confirm the center alignment. The edges of the film should be even and symmetrical on the handrail shoulders. If not, the position of roll 174 can be adjusted.

Figure 7A:
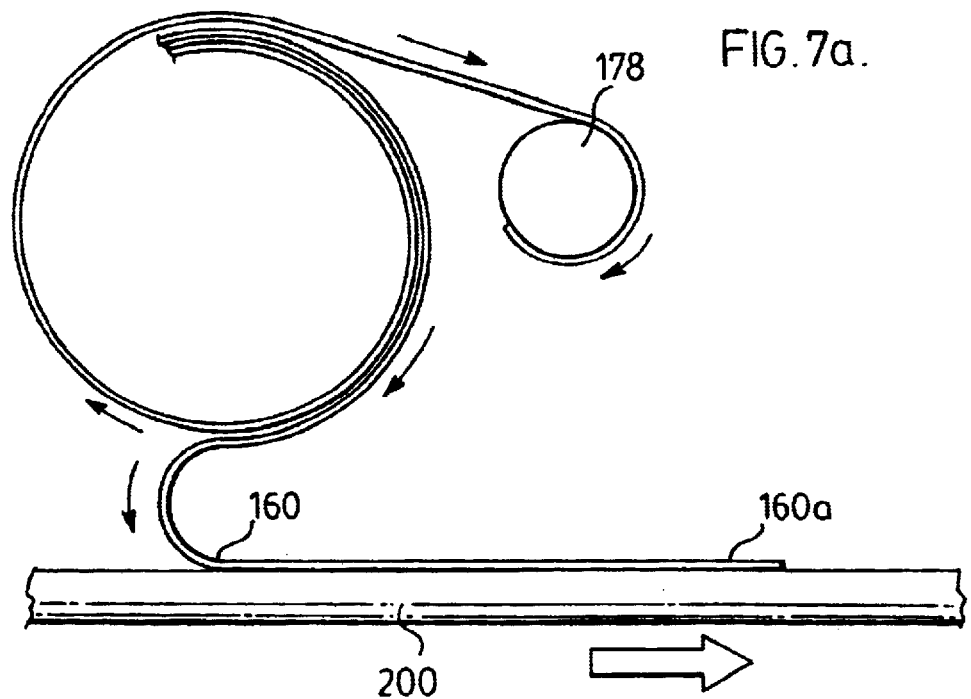
FIGS. 7a, 7b and 7c are schematic views showing paths of the film and release sheet and wrapping of the film around the handrail.
Figure 7B:
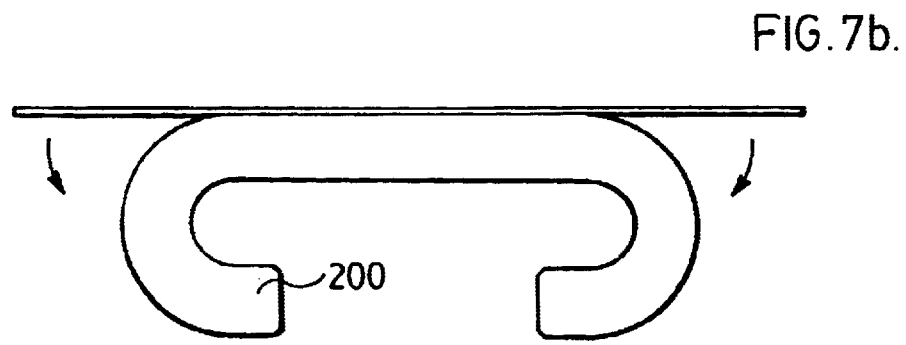
Figure 7C:
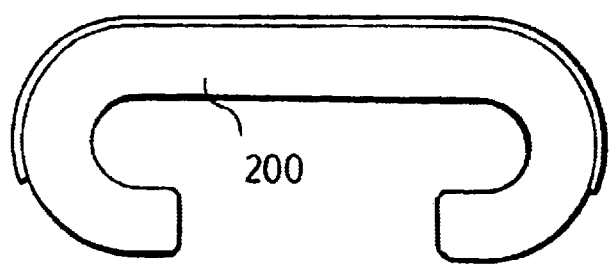

The leading portion of the film 160 adjacent the end 160a is then manually wrapped around the handrail 20, to the configuration shown in FIG. 7c, ensuring that no bubbles are formed or left under the film. The pressing mechanism 90 is then closed, and the escalator jogged to run a test strip of approximately five feet to ensure that no bubbles or wrinkles are formed. The pressure applied by roll 46 can be adjusted by turning a nut (not shown) below spring 48a on plunger 52 Roll pressure within press mechanism 90 is adjusted by turning the bolt 105a which varies the closing of the two halves of the pressing mechanism.

Once it has been established that the apparatus is properly centered with adequate clearances and that the film 160 is being applied uniformly without wrinkles, bubbles, etc., then the escalator can be operated to run the film around the entire length of the handrail.

The operator watches for the end 160a of the film to come back towards the apparatus 10. End 160a, which was pressed down by hand, passes underneath the roller 41 which helps ensure that the film was adequately pressed onto the handrail. Once end 160a returns to the mechanism, a portion of the film is allowed to overlap the end 160a by approximately 12 inches.

At this time, the swing arm 60 is raised, and pressure on the roller 46 is released by engaging the handle 56. The pressing mechanism 90 is opened. The film is cut. The threaded screw member 21 is loosened to permit removal of the upper portion of the apparatus 10 from the support member 12. The support member 12 with the vacuum cups 16 is then removed separately.

An overlap splice is then prepared by pulling up 3 to 4 inches of the excess film. This is trimmed cleanly at a 90° angle. It is then smoothed down by hand ensuring that no bubbles or wrinkles are present. It can be noted that this splice joint is such that the natural action of rollers and other drive elements contacting the handrail will tend to smooth down the joint, rather than tending to lift up the end of the film. The film is then, effectively, continuous along the length of the handrail.

It is recognized that where the film 160 bears advertising, it would almost certainly be intended that a particular application only be left on an escalator for a set period of time. Indeed, rates for advertising on escalator handrails will almost certainly be determined on a time basis.

When a particular advertiser's time has ended and it is desired to replace the film, then the existing film needs to be removed. To do this, the escalator is stopped with the film splice exposed on one handrail (it is expected that each handrail will need to be stripped separately). The end of the film is peeled up, to reveal the end last applied to the handrail.

This end can then be peeled off itself. If the film peels cleanly, then the escalator can be started and the strip removed continuously while standing at the top or bottom of the escalator.

If the film 160 leaves any residue on the handrail 200, then it is preferred to proceed more slowly and to strip the handrail 200 carefully, to reduce the clean up time. In this case, it is preferred to leave the escalator turned off and from a lower angle, peel the film from the lip area to the top face in small steps and clean adhesive off as one proceeds.

Any remaining adhesive left on the handrail should be removed. To remove adhesive, EH 101 solvent blend, acetone, Oil Flo or Liftoff or other suitable solvent should be used, and again in accordance with manufacturers' instructions.

Even for a handrail that has had a film applied before, it should then be washed and sealed as detailed above.

It will be appreciated that while preferred embodiments of the invention have been described, numerous variations are possible within the scope of the invention as defined in the following claims.

In particular, the degree to which the film 160 wraps around the handrail can be adjusted and will depend on individual handrail profiles and installations. Having the film wrap a large way around the handrail lips is advantageous as it puts the edge of the film well away from users and not readily accessible to anyone who, for whatever reason, might want to try and peel it off. On the other hand, where the film wraps all the way around the lips, it can tend to buckle as the handrail travels around end rollers and the like. Accordingly, it is expected that some compromise will usually be needed between these two parameters.

On a more general note, the film described herein can be applied to a stationary handrail as used in a normal stairwell.

What is claimed is:

1. In combination, an elongate handrail having a top surface and adjacent shoulder surfaces and a flexible film adhered to the handrail, the film comprising: a film layer having a display surface thereon and a layer of adhesive between the film layer and the handrail along the length of the handrail bonding the film layer to the handrail, said film layer covering the top surface and at least a portion of said shoulder surfaces and wherein the flexible film is generally continuous along the length of the handrail.

2. A combination of a handrail and a film as claimed in claim 1, wherein the film layer covers substantially all of the shoulder surfaces.

3. In combination, an elongate handrail and a flexible film adhered to the handrail, the film comprising:

a first film layer and a first layer of adhesive between the first film layer and the handrail, bonding the first film layer on top of the handrail; and a second film layer and a second layer of adhesive bonding the second film layer to the first film layer, wherein the flexible film is generally continuous along the length of the handrail.

4. In combination, an elongate handrail and a flexible film adhered to the handrail, the film comprising:

a first film layer and a first layer of adhesive between the first film layer and the handrail, bonding the first film layer on top of the handrail; and a second film layer and a second layer of adhesive bonding the second film layer to the first film layer, wherein the flexible film is generally continuous along the length of the handrail and the film extends around the outer surfaces of the shoulders of the handrail.

5. A combination of a handrail and a film as claimed in claim 3 or 4 which includes printed matter on top of the first film layer, between the first film layer and the second layer of adhesive.

6. A combination of a handrail and a film as claimed in claim 5, wherein the printed matter comprises a pattern repeated at regular intervals along the length of the film.

7. A combination as claimed in claim 3 herein each layer of the film comprises polyurethane with an approximate thickness of 3 mil and an appropriate adhesive with an approximate thickness of 1 mil.

8. In combination, an elongate handrail and a flexible film adhered to the handrail, the film comprising: a film layer and a layer of adhesive between the film layer and the handrail along the length of the handrail bonding the film layer to the handrail, wherein the flexible film is generally continuous along the length of the handrail, wherein the handrail comprises a continuous loop of handrail, intended to be driven in use on an escalator or moving walkway, and wherein the film includes end portions which overlap one another to form a spliced joint.

9. A combination of a handrail and a film as claimed in claim 8, wherein the film extends around the outside of the handrail and partially covers the shoulders of the handrail.

10. A combination of a handrail and a film as claimed in 1, 2, 8 or 9, wherein the film layer is provided with printed matter.

11. A combination of a handrail and a film as claimed in claim 10, wherein the printed matter comprises a pattern repeated at regular intervals along the length of the film.

* * * * *

UNITED STATES PATENT AND TRADEMARK OFFICE
CERTIFICATE OF CORRECTION

PATENT NO.    : 6,682,806 B1
DATED         : January 27, 2004
INVENTOR(S)   : John McLeod It is certified that error appears in the above-identified patent and that said Letters Patent is hereby corrected as shown below:

<u>Title page,</u>
Item [75], Inventors, "Ronald L. Bugg" has been deleted.

Signed and Sealed this

Twenty-ninth Day of June, 2004

JON W. DUDAS
*Acting Director of the United States Patent and Trademark Office*